(12) United States Patent
Kishigami et al.

(10) Patent No.: US 8,295,136 B2
(45) Date of Patent: Oct. 23, 2012

(54) OPTICAL RECORDING DEVICE AND METHOD

(75) Inventors: Tomo Kishigami, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/174,990

(22) Filed: Jul. 1, 2011

(65) Prior Publication Data

US 2012/0002523 A1 Jan. 5, 2012

(30) Foreign Application Priority Data

Jul. 2, 2010 (JP) ................................. 2010-151605

(51) Int. Cl.
*G11B 7/00* (2006.01)

(52) U.S. Cl. .......................... 369/47.53; 369/116; 369/94

(58) Field of Classification Search .................. 369/47.1, 369/47.27, 94, 47.51, 47.52, 53.22
See application file for complete search history.

(56) References Cited

U.S. PATENT DOCUMENTS 8,218,414 B2 * 7/2012 Takahashi et al. .............. 369/94
2006/0140085 A1 6/2006 Mashimo
2008/0101209 A1 5/2008 Nagai et al.
2009/0016184 A1 1/2009 Kikukawa et al.

FOREIGN PATENT DOCUMENTS

| JP | 2006-179153 A | 7/2006 |
| JP | 2008-108388 A | 5/2008 |
| JP | 2008-192258 A | 8/2008 |
| JP | 2009-20972 A | 1/2009 |

* cited by examiner

*Primary Examiner* — Nabil Hindi
(74) *Attorney, Agent, or Firm* — Birch, Stewart, Kolasch & Birch, LLP

(57) ABSTRACT

Before new information is recorded on a comparatively deep recording layer in a multilayer optical recording disc, a predetermined target value of a reproduced signal parameter is read from the disc itself or from a separate storage unit, the recorded/unrecorded states of the shallower recording layers are determined, and the target value is corrected on the basis of these states. The correction is based on a predetermined difference in the value of the reproduced signal parameter caused by a difference in the recorded/unrecorded states of the shallower recording layers. The corrected target value is used in calibration of the recording power by means of a test write. This correction of the target value permits reliable recording on a multilayer optical disc without delaying the start of the recording process.

18 Claims, 7 Drawing Sheets

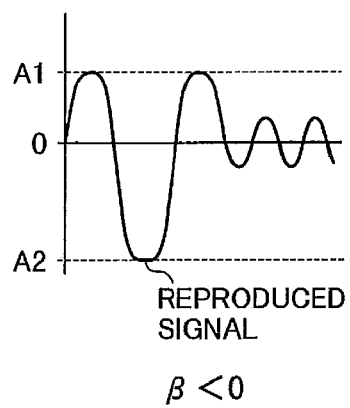
FIG.2A
REPRODUCED SIGNAL
$\beta < 0$
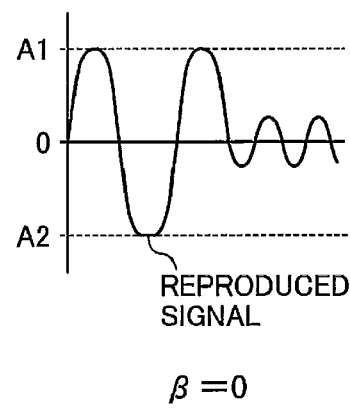
FIG.2B
REPRODUCED SIGNAL
$\beta = 0$
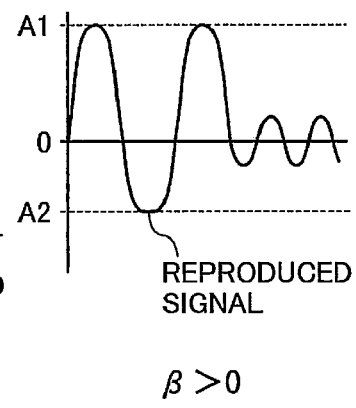
FIG.2C
REPRODUCED SIGNAL
$\beta > 0$
FIG.3
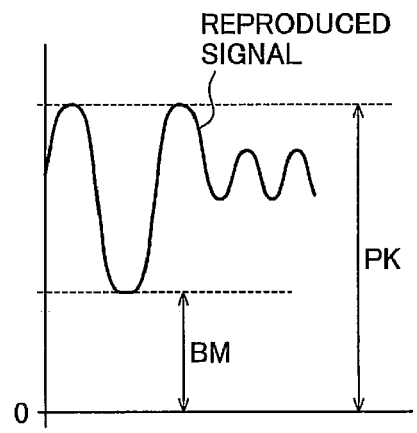

OPTICAL RECORDING DEVICE AND METHOD

BACKGROUND OF THE INVENTION

1. Field of the Invention

The present invention relates to an optical recording device and method for recording information on an optical disc having a plurality of recording layers, and more particularly to optimum power control (OPC).

2. Description of the Related Art

OPC is carried out by performing a test write on an optical disc to make an optimal calibration of the recording power before recording the intended information on the disc. In a multilayer optical disc with a plurality of recording layers, when the recording is carried out on a layer in a deep position as seen from the side of incidence of the recording light, the optimal recording power differs depending on whether or not information has already been recorded on the shallower intervening recording layers. It is therefore desirable to provide recording power settings that produce stable recording performance in the information recording area, without performance variations even when the layer or layers shallower than the recording target layer present a mixture of recorded and unrecorded states.

Japanese Patent Application Publication (JP) No. 2008-192258 (pp. 1-12, FIGS. 1-6) discloses one method of finding such settings. The test write area is divided into a plurality of subareas, information is recorded on the shallower layers so as to create a different combination of recorded and unrecorded shallower layers in each subarea, OPC is performed in each subarea, and in recording on the target layer in the information recording area, the optimum recording power found for the relevant combination is used.

JP 2008-108388 (pp. 1-12, FIGS. 1-5) discloses a method that forms a similar plurality of subareas with differing combinations of recorded and unrecorded states in the shallower layers in the test write area, performs OPC in each of the subareas, and then uses the average of the OPC results as the optimal recording power.

JP 2006-179153 (pp. 1-10, FIGS. 1-4) discloses a method that decides from the amount of light reflected from spaces whether the shallower layers are in the recorded or unrecorded state, and switches the recording power accordingly.

The methods employed in JP 2008-192258 and JP 2008-108388 are excessively time-consuming because of the time required to record information so as to form a plurality of subareas with differing combinations of recorded and unrecorded states in the shallower layers in the test write area, and then perform OPC in each subarea. With these methods too much time elapses before actual recording starts. The number of times the recording power can be optimally calibrated is also limited, because each OPC operation uses up considerable amount of disc area; consequently, the number of times additional information can be recorded on a disc is limited.

The method of JP 2006-179153, which discriminates between the recorded and unrecorded states by the amount of light reflected from spaces, is apt to discriminate incorrectly because of reflectance variations due to irregularities in the formation of the recording layers and other layers in the optical disc, in which case information cannot be recorded with the optimal recording power.

SUMMARY OF THE INVENTION

An object of the present invention is to provide an optical recording device and method which is capable of providing recording power settings that ensure stable recording performance without performance variations even when the shallower layers present a mixture of recorded and unrecorded states.

The invention provides an optical recording device for recording information on an optical recording medium having a plurality of recording layers by irradiation with laser light, comprising:

a target value reading unit that reads a standard target value for calibrating recording power from the optical recording medium or from within the optical recording device, the standard target value being determined in advance for each class of optical recording medium;

a recording power calibration unit that calibrates the recording power by performing a test write in a recording power calibration area provided in a recording layer having an information recording area;

an information recording unit that records information on the recording layer having the information recording area, by use of the recorded power calibrated by the recording power calibration unit;

a recorded state discrimination unit that determines a recorded state of one or more shallower recording layers in front of the recording layer to be recorded by the information recording unit, as seen from a laser light incidence side in a position corresponding to the recording power calibration area; and a target value correction unit that corrects the standard target value to generate a corrected target value, based on a difference in a reproduced signal parameter between a first recorded state of one or more shallower recording layers in front of a recording layer in which test data is to be recorded, as seen from a laser light incidence side, and a second recorded state of the shallower recording layers, and on the recorded state as determined by the recorded state discrimination unit;

wherein the recording power calibration unit calibrates the recording power by use of the corrected target value.

With the present invention, even when the layers shallower than the recording layer for recording information present a mixture of recorded and unrecorded states in the information recording area, variations in recording performance due to changes in their states are suppressed and stable recording can be performed. In addition, OPC is carried out only in the layer in which the information will be recorded, so that the optimal recording power can be found by OPC without the excessive use of time and recording area.

BRIEF DESCRIPTION OF THE DRAWINGS

In the attached drawings:

FIGS. 2A, 2B, and 2C show examples of asymmetry in the reproduced signal measured by the reproduction characteristic measurement unit in FIG. 1;

FIG. 3 shows an example of the modulation depth of the reproduced signal measured by the reproduction characteristic measurement unit in FIG. 1;

DETAILED DESCRIPTION OF THE INVENTION

An embodiment of the invention will now be described with reference to the attached drawings.

Figure 1:
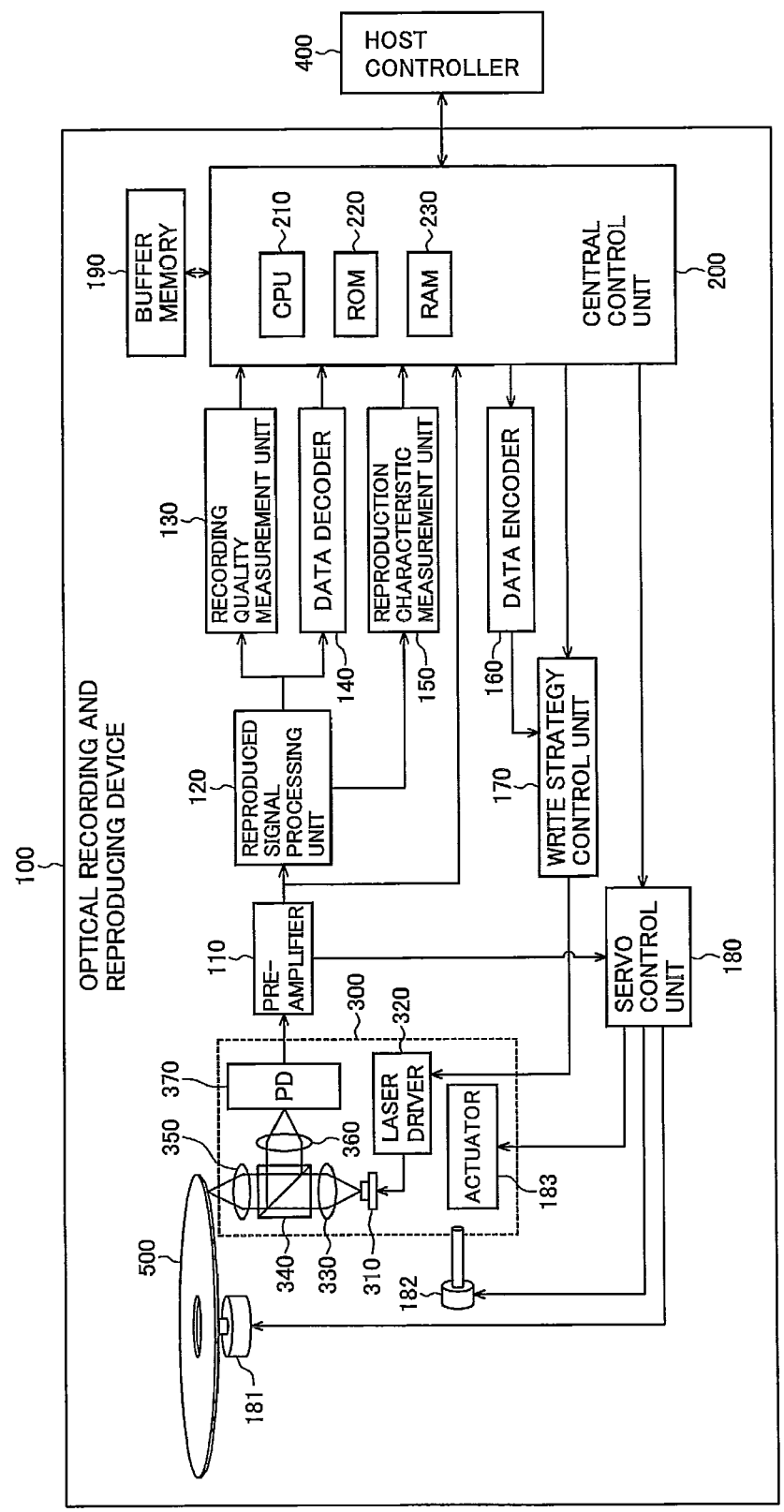
FIG. 1 is a block diagram of an optical recording and reproducing device embodying the invention.

FIG. 1 shows an exemplary basic configuration of the optical recording and reproducing device 100 in the embodiment of the invention. The optical disc 500 shown in FIG. 1 is, for example, a Blu-ray disc (BD).

A servo control unit 180 controls a spindle motor 181 that turns the optical disc 500, a sled motor 182 that moves an optical head 300, and an actuator 183 (shown as a functional block) of the optical head 300.

The reproduced signal from the optical head 300 is amplified in a preamplifier circuit 110 and input to a central control unit 200. The central control unit 200 decodes address information from the input signal to ascertain the present position of the optical head 300.

The difference between the address information obtained at the present position and the address information of the position to be accessed (the access target position) is given to the servo control unit 180, which controls the sled motor 182 to move the optical head 300 to the access target position. On the basis of a servo error signal from the preamplifier circuit 110, the servo control unit 180 drives the actuator 183 to carry out focus control and tracking control.

During data reproduction, a laser beam emitted from a semiconductor laser 310 with an output value (reproducing power) necessary for data reproduction passes through a collimating lens 330, beam splitter 340, and objective lens 350 and is focused onto the optical disc 500. The light reflected from the optical disc 500 passes through the objective lens 350, is separated from incident light by the beam splitter 340, and is received, via a detection lens 360, by a photodetector (PD) 370.

Of the above components, the semiconductor laser 310, collimating lens 330, beam splitter 340, objective lens 350, and detection lens 360 constitute the optical system, and the optical system and the photodetector 370, laser driver 320, and actuator 183 constitute the optical pick-up 300. In some configurations, elements or lenses that correct spherical aberration may be provided in the optical system in the optical pick-up 300, to achieve optimal control for the optical disc 500.

The photodetector 370 converts the light signal to an electrical signal. The converted electrical signal output by the photodetector 370 is input, via the preamplifier circuit 110, to the central control unit 200 and a reproduced signal processing unit 120.

The reproduced signal processing unit 120 equalizes (reshapes) the electrical signal from the preamplifier circuit 110 and inputs the reshaped signal to a recording quality measurement unit 130 and a data decoder 140. The reproduced signal processing unit 120 also inputs the electrical signal as received, before equalization, to a reproduction characteristic measurement unit 150.

The reproduction characteristic measurement unit 150 determines the value of a parameter used in the recording power calibration needed for recording, such as an asymmetry value or modulation depth of the reproduced signal. The recording quality measurement unit 130 determines the quality of the reproduced signal, based on a jitter value or error rate.

The data decoder 140 binarizes the input reproduced signal and generates (reproduces) the data recorded on the optical disc 500 by performing such processes as decoding and error correction. The central control unit 200 stores the generated data in a buffer memory 190, then sends the data to a host controller 400 to which the optical recording and reproducing device 100 is connected.

When the reproduction characteristic measurement unit 150 determines an asymmetry value, the reproduction characteristic measurement unit 150 passes the electrical signal (the signal output from the preamplifier circuit 110) through an alternating current (AC) coupling and calculates the asymmetry value $\beta$ from the AC-coupled electrical signal.

Exemplary AC-coupled electrical signals are shown in FIGS. 2A to 2C. The reproduction characteristic measurement unit 150 detects a peak level A1 and a bottom level A2 of the signals illustrated in FIGS. 2A to 2C, and calculates the asymmetry value $\beta$ from the detected peak level A1 and bottom level A2, using the following equation (1).

$$\beta = (A1 + A2)/(A1 - A2) \quad (1)$$

The peak level A1 and the bottom level A2 appear in an area where the longest spaces and the longest marks occur alternately. The values of the peak level A1 and the bottom level A2 are calculated relative to a zero level equal to the mean of the peak level and bottom level in an area where the shortest spaces and the shortest marks appear alternately.

Among the asymmetry values $\beta$ detected by the reproduction characteristic measurement unit 150 from the exemplary reproduced signals (the signals output from the preamplifier circuit 110) in FIGS. 2A to 2C, FIG. 2A shows a case in which $\beta$ is less than zero, FIG. 2B shows a case in which $\beta$ equals zero, and FIG. 2C shows a case in which $\beta$ is greater than zero.

The asymmetry calculation method is not limited to the method given above. Any method that calculates the degree of asymmetry between the recorded signal with the longest mark (an 8T signal for a BD) and the recorded signal with the shortest mark (a 2T signal for a BD) may be used.

When the reproduction characteristic measurement unit 150 determines the modulation depth, the reproduction characteristic measurement unit 150 detects the peak level PK and bottom level BM of the input electrical signal, but the peak level PK and the bottom level BM are detected from a signal obtained through DC coupling, instead of through AC coupling as in the calculation of an asymmetry value. The modulation depth is calculated from PK and BM by the following equation (2).

$$\text{Modulation depth} = (PK - BM)/PK \quad (2)$$

FIG. 3 shows an exemplary signal obtained by DC coupling. As shown, the peak PK and bottom BM values are measured relative to a zero level equal to the output offset value when there is no input to the photodetector 370 (no input of reflected light from the optical disc). The peak PK and bottom BM values correspond to the levels of the longest space and longest mark, respectively.

During data recording, the central control unit 200 stores data received from the host controller 400 in the buffer memory 190, then uses a data encoder 160 to add an error correction code, modulate the data according to a modulation rule, and generate data to be recorded according to the format of the optical disc 500.

On the basis of the data to be recorded, the write strategy control unit 170 generates a write strategy signal. The write strategy is set by the central control unit 200. Then when the data encoder 160 sends the write strategy control unit 170 data specifying a mark with a length of n periods, the write strategy control unit 170 outputs a corresponding write strategy signal (a signal generated according to the write strategy, having substantially the same waveform as the train of light pulses to be emitted).

The laser driver 320 drives the semiconductor laser 310 by supplying drive current responsive to the generated write strategy signal. A laser beam having an output value (recording power) necessary for recording the data is emitted from the semiconductor laser 310 and focused on the optical disc 500 via the collimating lens 330, the beam splitter 340, and the objective lens 350. A recorded pattern of marks and intervening spaces is thereby formed.

The central control unit 200 controls the overall operation of the optical recording and reproducing device 100 when it writes data on and reads data from the optical disc 500. The central control unit 200 receives information on recording quality represented by jitter or the like from the recording quality measurement unit 130, receives an asymmetry value or modulation depth value from the reproduction characteristic measurement unit 150, receives reproduced data from the data decoder 140, and provides the data encoder 160, the write strategy control unit 170, the laser driver 320, and the servo control unit 180 with control signals.

The central control unit 200 also controls the correction of OPC parameters, as will be described below with reference to FIGS. 7 to 11.

The central control unit 200 includes, for example, a CPU 210, a ROM 220 that stores programs for operating the CPU 210, and a RAM 230 for storing data. The programs stored in the ROM 220 include programs that carry out calculations for OPC parameter corrections, as described below with reference to FIG. 8, and set values necessary for those calculations.

Next, the configuration of a one-sided recordable optical disc having a plurality of recording layers will be described and phenomena particular to multilayer recording will be discussed.

Figure 4:
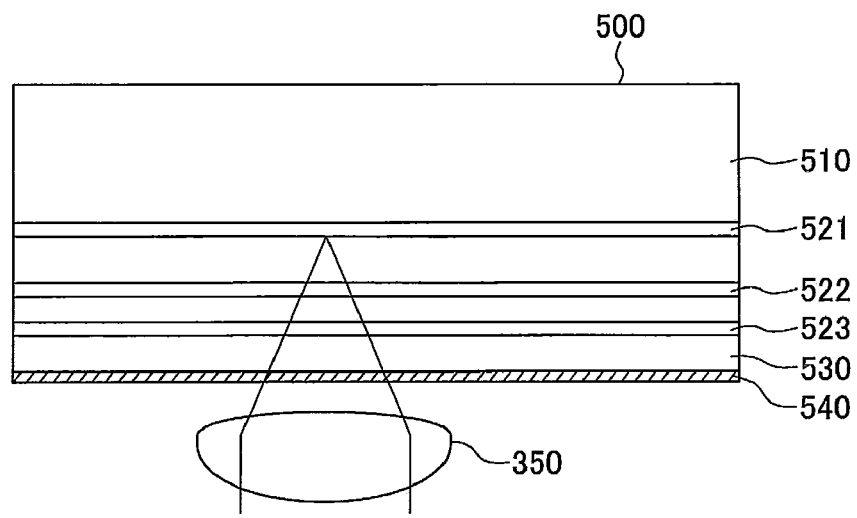
FIG. 4 shows the disc structure of a multilayer recordable optical disc having three recording layers, as an example of the optical disc in FIG. 1.

The exemplary three-layer optical disc 500 shown in FIG. 4 has a substrate 510, a first recording layer 521, a second recording layer 522, a third recording layer 523, a cover layer 530, and a protective layer 540. The light from the objective lens 350 of the optical pick-up 300 shown in FIG. 1 is incident from the side of the protective layer 540.

Figure 5:
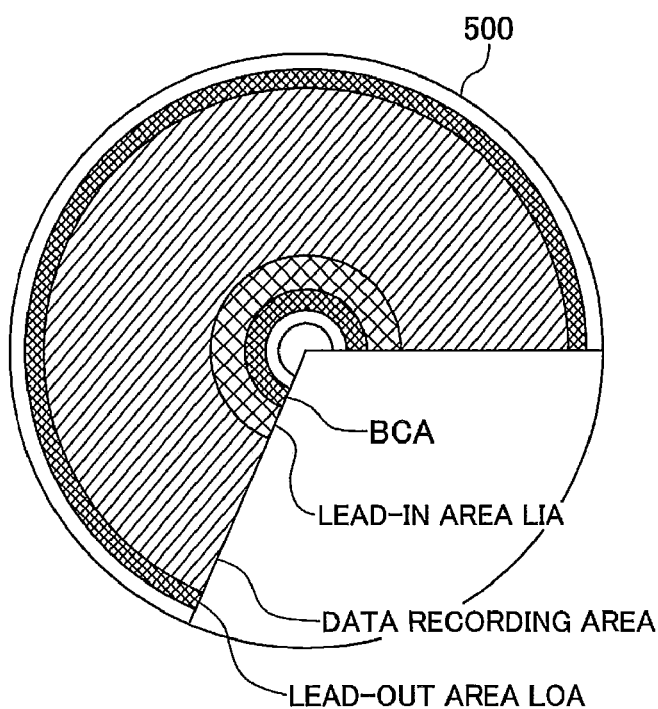
FIG. 5 shows an exemplary configuration of areas on the optical disc in FIG. 1.

In the exemplary optical disc configuration shown in FIG. 5, a lead-in area LIA, in which information unique to the optical disc, control information for controlling recording and reproducing operations, and other information is recorded, is positioned near the inner edge of the disc. The areas in which OPC (optimal control and calibration of the recording power) is performed are also positioned in the lead-in area LIA. In an alternative configuration, these information and areas may also be positioned in the lead-out area LOA.

Figure 6:
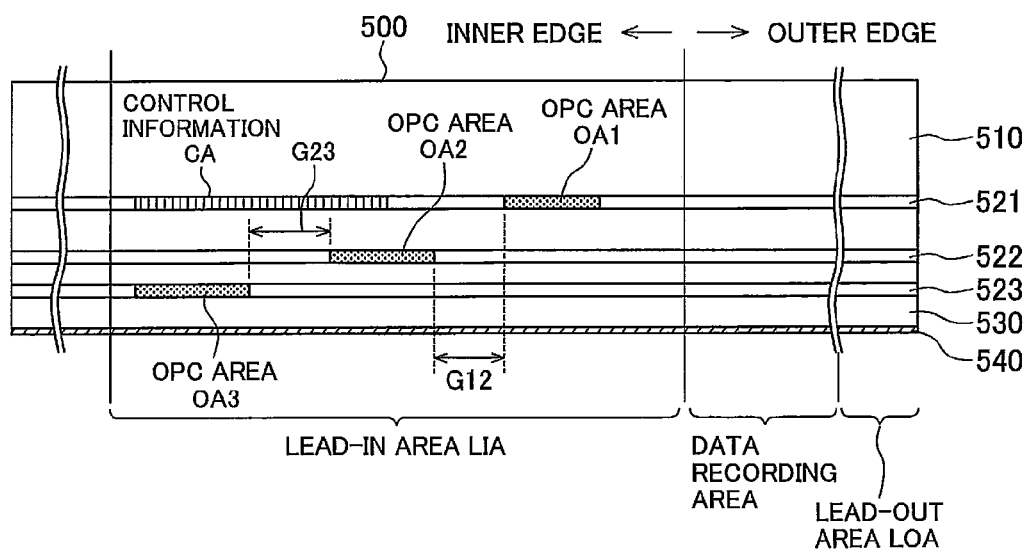
FIG. 6 shows an exemplary configuration of the lead-in area of the exemplary multilayer recordable optical disc in FIG. 5.

The exemplary OPC areas in the lead-in area LIA in FIG. 6 include an OPC area OA1 for the first recording layer 521, an OPC area OA2 for the second recording layer 522, and an OPC area OA3 for the third recording layer 523. The lead-in area LIA also includes a control information area CA. The OPC areas OA1, OA2, OA3 may also be referred to as recording power calibration areas.

As shown in FIG. 6, the OPC areas OA1, OA2, and OA3 are positioned with guard areas GS12 and GS23 interposed in the radial direction between the OPC areas, so that the OPC areas do not overlap each other in the radial direction.

The guard areas GS12 and GS23 are provided to avoid possible effect of eccentricity between the layers, and effect of beam diameter in the shallower layer or layers, when recording and reproduction are carried out on a deeper layer.

Although not shown in the drawing, areas for recording disc management information and like information may also be provided, within the lead-in area LIA, in positions outside the OPC areas and CA area. When an area for recording disc management information is located in a shallower layer in front of an OPC area, the state (recorded or unrecorded) of the layer shallower than OPC area differs depending on whether or not information has been recorded in the disc management information area.

The areas for recording disc management information are used to record information indicating the areas used for OPC, and the information indicating the recorded/unrecorded states of the lead-in areas, lead-out areas, and data areas. This information may be recorded in the form of recording end address information or flag information.

Whether the above information is recorded or not, and how it is recorded, differs depending on the specifications of the optical disc.

Before information is recorded on an optical disc inserted in a recording and reproducing device, the recording power is generally optimized by performing a test write. In a multilayer optical disc having a plurality of recording layers, recording power is optimized using the OPC area provided on the recording layer for recording information. Next, this procedure will be described.

First, a test write in the optical disc 500 is performed, by using a random test data pattern and varying the recording power, for example. The area of the optical disc 500 on which this test pattern is recorded is reproduced, the reproduction characteristic measurement unit 150 detects an asymmetry value as a reproduced signal parameter, and the central control unit 200 compares the detected asymmetry value with a target asymmetry value (OPC target value) to calculate the optimal recording power.

In general, the higher the recording power is, the higher the asymmetry value is, while the lower the recording power is, the lower the asymmetry value is. An asymmetry value is frequently used to optimize the recording power in write-once optical recording media.

The central control unit 200 compares the detected asymmetry values corresponding to a plurality of different recording power values with the target value, and sets the recording power that gives the detected value nearest the target value as an optimal recording power.

Alternatively, a test write in the optical disc 500 may be performed with one recording power, reproduction may be performed, an asymmetry value may be detected from the reproduced results, the detected asymmetry value may be compared with the target asymmetry value, and the recording power may be increased or decreased according to the result of the comparison to arrive at the optimal recording power.

An asymmetry value is generally used as the OPC target value for a write-once disc (DVD-R, BD-R, etc.). For a rewritable disc (DVD-RW, BD-RE, etc.), modulation depth is generally used instead of an asymmetry value. Also, for a rewritable disc, the modulation depth that generates the optimal recording power is not used as a target value. Instead, the modulation depth in a range of recording power where changes in modulation depth are large in relation to changes in the recording power (a range where the recording power is lower than the optimal recording power) is generally used as the target value, and the optimal recording power is calculated by multiplying the calculated recording power by a preset coefficient.

Figure 7:
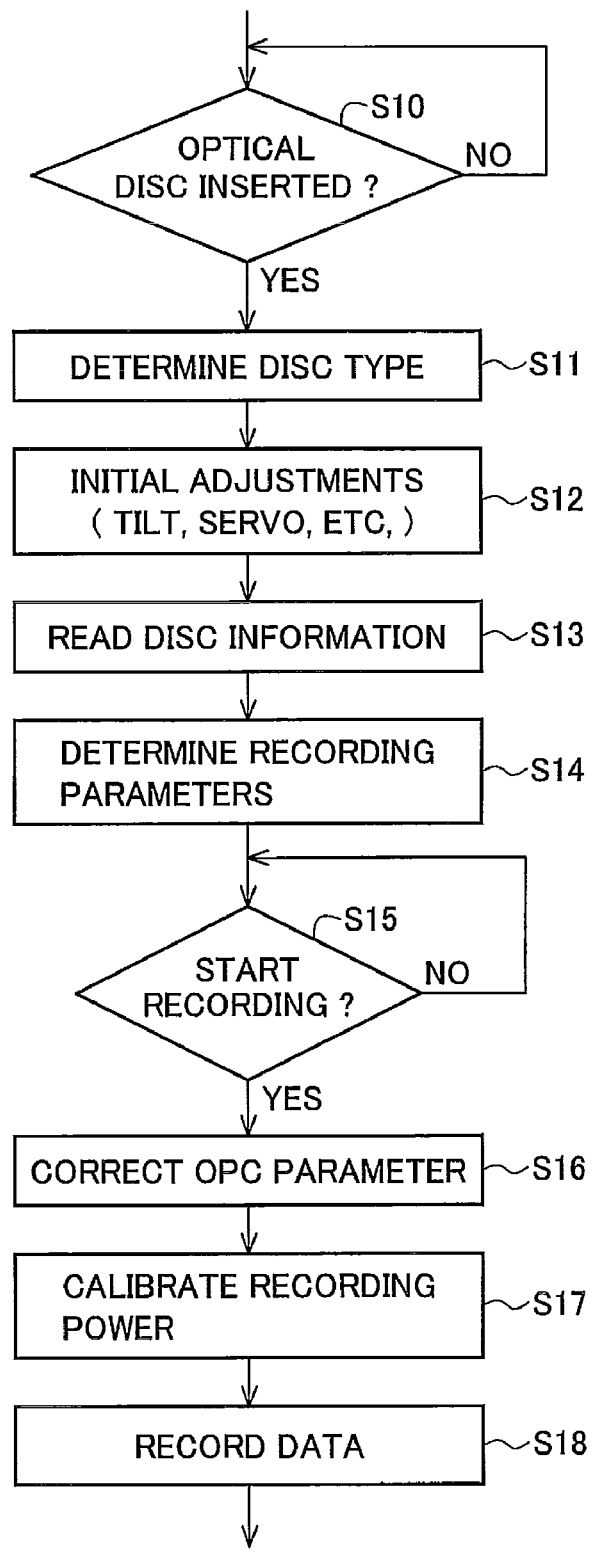
FIG. 7 is a flowchart showing an exemplary recording procedure used in the optical recording and reproducing device in FIG. 1.

The procedure followed in the optical recording method of the present embodiment will now be described with reference to FIG. 7.

When the optical disc 500 used for recording intended information is first inserted in the optical recording and reproducing device 100, a sensor (not shown) detects the insertion (step S10) and notifies the central control unit 200 of the insertion, and the central control unit 200 causes the servo controller 180 to drive the optical head 300, and determines the kind of the optical disc 500 (CD, DVD, BD or the like) inserted into the optical recording and reproducing device 100, and the number of layers in the optical disc 500 (step S11).

Next, after adjustment of the servo conditions (servo settings), adjustment for the tilt angle of the optical disc 500, and so on in step S12, the information unique to the optical disc, control information for controlling recording and reproducing operations, and other such information are read from the optical disc 500 in step S13.

Next, in step S14, recording parameters are determined on the basis of the information (ID or the like) unique to the optical disc read in step S13. The ROM 220 in the central control unit 200 of the optical recording and reproducing device 100 includes a prestored table of recording parameters to be used as target values (standard target values of the recording parameters) under standard conditions for each value of the information unique to the optical disc. The recording parameters (standard target values) corresponding to the information unique to the optical disc are read and set as the recording parameters to be used for recording. These recording parameters include write strategy parameters (a standard write strategy) that determine the shape of emitted light pulses, and an OPC parameter for determining the recording power (OPC standard target value).

The same table also stores information necessary for correcting the OPC parameter. This information, which is also read in this step, will be described below.

The unique information has different values for each group or class of optical disc, such as kind, model, or lot. Therefore, the standard target values of the recording parameters for each unique information value can be considered as standard target values of the recording parameters for each class of optical disc, such as kind, model, or lot.

As an alternative to the above method in which the recording parameters are determined from a table stored in advance, a method can also be used in which prerecorded recommended values of the recording parameters are read from the optical disc 500 and used as standard target values.

Still alternatively, calculations may be carried out on the recommended values read from the optical disc 500 and modified recording parameters may be used as standard target values for recording.

After the process in step S14, when a recording command is given by means not shown in the drawings (Yes in step S15), the OPC parameter is corrected in step S16, as detailed below.

This correction is conducted when there are one or more recording layers shallower than the recording layer (intended information recording layer) including the information recording area (data recording area) in which the intended information is to be recorded and also including the area in which OPC will be carried out, as seen from the side of the disc on which recording light is incident (laser light incidence side), i.e., when there are one or more recording layers disposed between the intended information recording layer and the laser light incidence side.

In step S17, a test write is performed on the optical disc 500, using the OPC parameter as corrected in step S16 and the recording parameters set in step S14. Specifically, the write strategy given by the recording parameters set in the central control unit 200 in step S14 is set in the write strategy control unit 170, the write strategy control unit 170 generates a write strategy based on the test pattern, and a test write is performed on the optical disc 500 using the optical head 300. The optical head 300 then reproduces the area on the optical disc 500 where the test pattern was recorded. The central control unit 200 compares the reproduced signal parameter (asymmetry value or modulation depth) detected by the reproduction characteristic measurement unit 150 with the OPC parameter (asymmetry value or modulation depth) as corrected in step S16, performs control to make the reproduced signal parameter and OPC parameter match, and selects the recording power that makes these parameters match as the optimal recording power.

Finally in step S18, the writing of the intended data (intended information) intended to be written in the optical disc 500 is started, using the write strategy given by the recording parameters set in step S14 and the recording power determined in step S17.

Of the above processing, the processing in step S10 is carried out by the central control unit 200 and by a sensor (not shown) that detects the insertion of the optical disc, the processing in steps S11 and S12 is carried out by the optical head 300, the preamplifier circuit 110, the servo control unit 180 and the central control unit 200, the processing in step S13 is carried out by the optical head 300, the servo control unit 180, the preamplifier circuit 110, the reproduced signal processing unit 120, the data decoder 140, and the central control unit 200, the processing in step S14 is carried out by the central control unit 200, the processing in step S15 is carried out by the central control unit 200 and an interface unit (not shown) that receives recording commands, the processing in step S16 is carried out by the servo control unit 180, the preamplifier circuit 110, the reproduced signal processing unit 120, the reproduction characteristic measurement unit 150, the central control unit 200, the write strategy control unit 170, and the optical head 300, and the data recording processing in step S17 and subsequent steps is carried out by the data encoder 160, the write strategy control unit 170, the servo control unit 180, the central control unit 200, and the optical head 300.

Figure 8:
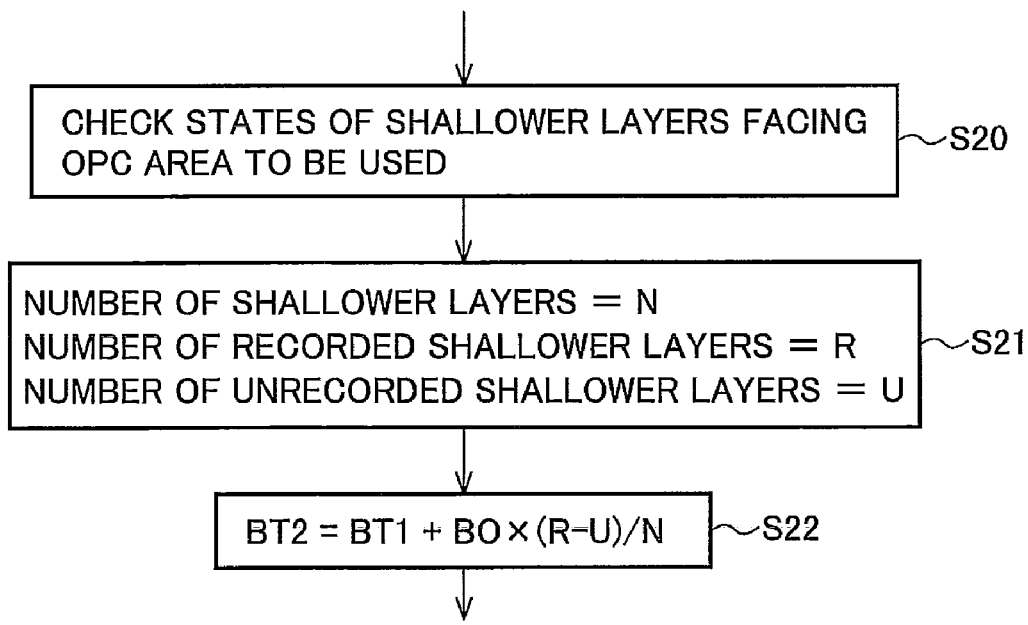
FIG. 8 is a flowchart showing an exemplary OPC parameter correction procedure used in the optical recording and reproducing device in FIG. 1.

Next the processing for the OPC parameter correction in step S16 will be described with reference to FIG. 8.

In step S20, the total number (Nr) of the one or more shallower recording layers (recording layers disposed between the intended information recording layer and the laser light incidence side) is obtained, and the state of the areas facing the area in which OPC will be carried out, in the recording shallower layers is checked.

For example, information (address information) indicating the position of OPC area to be used is read from the management area of the optical disc 500, and the recorded/unrecorded state (recorded or unrecorded state) of the corresponding area in each shallower layer is determined from the recording management information stored in the management area of the optical disc 500 or another area in the lead-in area LIA.

The invention is not limited to the arrangement in which the states of the shallower layers are determined from information in the management area as described above. If the states of the shallower layers are predefined in the disc specifications, the states of the shallower layers can be determined from the specifications. If the states cannot be determined from information in either the management area or the disc specifications, the areas in the corresponding layers may be reproduced to find out whether a signal has been recorded or not.

In step S21, the states of the shallower layers as determined above are used to set the total number of shallower layers Nr, the number of recorded shallower layers R, and the number of unrecorded shallower layers U.

Next, in step S22, the OPC parameter is corrected by the following formula.

$$BT2=BT1+BO\times(R-U)/Nr \quad (3)$$

BT2 is the OPC parameter after the correction (the corrected target value).

BO is an OPC target offset (also referred to as a 'standard target offset') set for the individual optical disc, i.e., for each class of optical disc.

BT1 is the OPC parameter before the correction, and is an OPC standard target value that optimizes overall recording performance. 'Optimizes overall recording performance' means that the recording performance obtained under different conditions, considered overall, is optimal. Frequently, the overall recording performance is optimized by optimizing the recording performance under average or median recording conditions.

Figure 11:
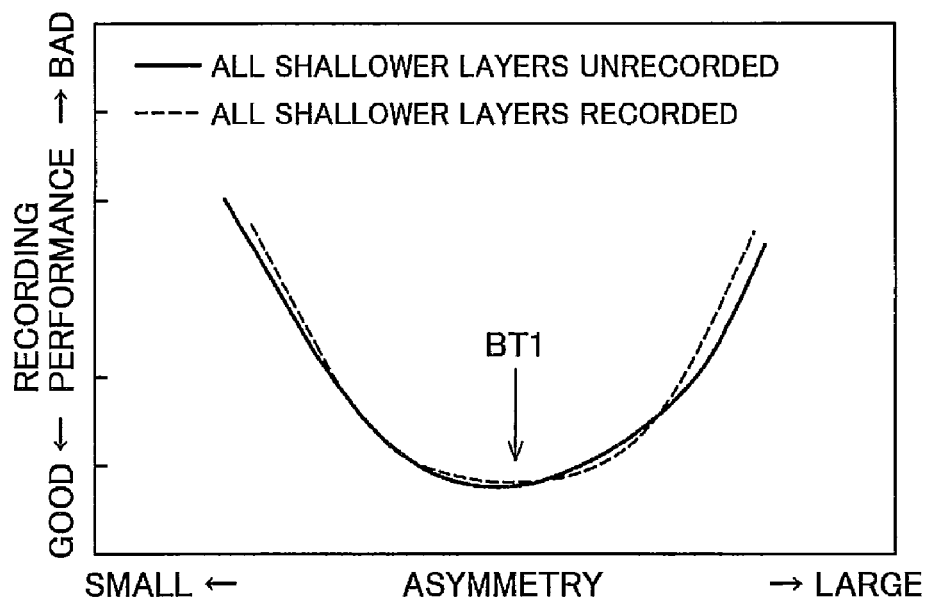
FIG. 11 is a graph showing exemplary relations between asymmetry and recording performance in a multilayer recordable optical disc.

The OPC standard target value BT1 can be obtained by conducting experiments for each class of optical disc, as identified by the information unique to the optical disc, in advance, deriving characteristic curves like those shown in FIG. 11, and finding the value that optimizes overall recording performance under a plurality of different recording conditions, for example, conditions using different recording power. BT1 in FIG. 11 represents an optimal value overall. Alternatively, a recommended OPC target value recorded on the optical disc may be used as the OPC standard target value. The OPC standard target value BT1 is not necessarily the value that gives the best recording performance. Instead, considering the range of variation in recording performance relative to a reproduced signal parameter, the OPC standard target value can be set to such a value that when the reproduced signal parameter varies in the plus and minus directions by equal amounts, recording performance degrades by equal amounts within an acceptable tolerance range.

The experiments for obtaining the characteristic curves like those shown in FIG. 11 include recording test data in an area (a test data recording area) in a recording layer (test data recording layer) in the optical disc used for recording and reproduction of the test data, with the shallower layers in different recorded states (different combinations of recorded and unrecorded states), reproducing the test data from the test data recording area, and evaluating the reproduced signal parameter, e.g., asymmetry value of the signals obtained when the test data is reproduced. Here, the "shallower layers" means recording layers disposed in front of the test data recording layer as seen from the side of the optical disc on which the laser light is incident, i.e., disposed between the test data recording layer and the laser light incidence side. The "different recorded states" are, for example, states with different numbers of recorded layers among the shallower layers, at a position corresponding to the test data recording area.

The OPC target offset BO is also determined in advance for each class of the optical disc, from the experiments for obtaining the characteristic curves like those shown in FIG. 11, and is one-half the difference DB (the reproduced signal parameter difference) in the asymmetry value $\beta$ between cases in which the shallower layers are all recorded and in which they are all unrecorded, with the recording power used being identical, and is given more specifically by the following equation.

$$BO=(BR-BU)/2 \quad (4)$$

In this equation, BR and BU are asymmetry values $\beta$ obtained from recording carried out at the same power. BR is the asymmetry value $\beta$ when all the shallower layers are recorded and BU is the asymmetry value $\beta$ when all the shallower layers are unrecorded. BR and BU are found for each class of optical discs having the same unique information identifying, for example, the disc kind, model, or lot, and BO is calculated from BR and BU. BO is stored together with the standard target value BT1 described above in the ROM 220 in the central control unit 200 of the optical recording and reproducing device 100, as a part of a table for possible value of unique information.

The ROM 220 therefore also serves as a means of storing an OPC target value offset, i.e., standard target value offset (BO) and a standard target value (BT1) for each possible value for each possible value of the unique information.

Next the reason for correcting the OPC parameter in this way will be described with reference to the graphs in FIGS. 9, 10, and 11, which show exemplary characteristic curves obtained by recording on and reproducing from an optical disc.

Figure 9:
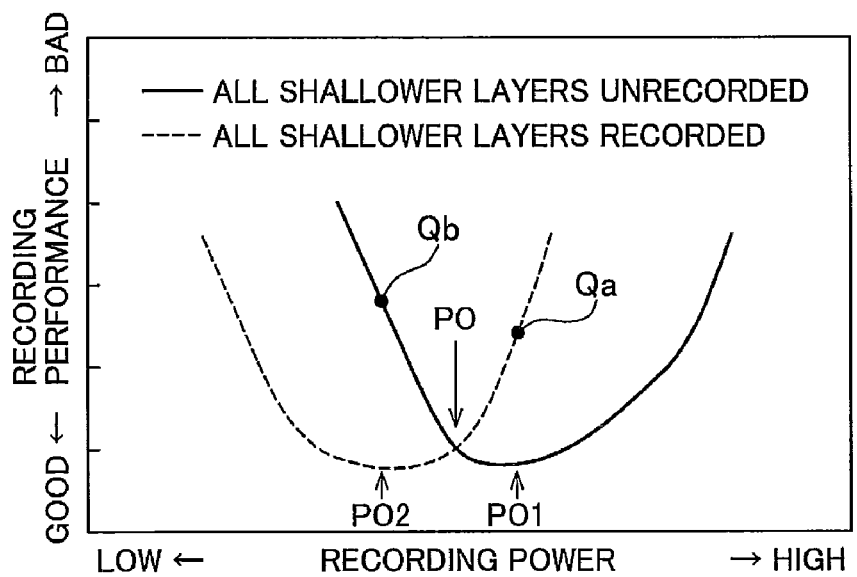
FIG. 9 is a graph showing exemplary relations between recording power and recording performance in a multilayer recordable optical disc.

FIG. 9 shows the relation between recording power and recording performance in the first recording layer, which is the deepest layer as seen from the side of the disc on which the recording light is incident. It is assumed that the first recording layer is used as the intended information recording layer as well as the test data recording layer. Recording performance means reproducing performance when an area having signals recorded is reproduced. Recording performance can be represented by a jitter value, a Maximum Likelihood Sequence Error (MLSE) value, or an error rate. In FIG. 9, the solid line represents the case in which all the shallower layers (all the layers shallower than the first recording layer, i.e., the second to fourth recording layers) are unrecorded, and the dashed line represents the case in which all the shallower layers (the second to fourth recording layers) are recorded. As shown in FIG. 9, the recording power that gives the best reproducing performance differs depending on the states (recorded or unrecorded states) of the shallower recording layers. PO1 in FIG. 9 represents the optimal recording power when all of the shallower recording layers are unrecorded, while PO2 represents the optimal recording power when all of the shallower recording layers are recorded.

When recording is carried out at recording power PO1 for example, the best recording performance can be obtained in areas where all the shallower recording layers are unrecorded, but recording performance deteriorates sharply to the value indicated by point Qa when recording is performed in an area where all the shallower recording layers are recorded.

Similarly, recording performance deteriorates sharply to the value indicated by point Qb if recording at recording power PO2 is carried in an area above which all the shallower layers are unrecorded.

It would be desirable to perform recording at a recording power that can give good performance in both the case in which all the shallower recording layers are unrecorded and the case in which all the shallower recording layers are recorded. The desired recording power is accordingly PO, which yields the best recording performance under intermediate recording conditions and shows only slight degradation if the actual recording conditions deviate from the intermediate conditions.

Figure 10:
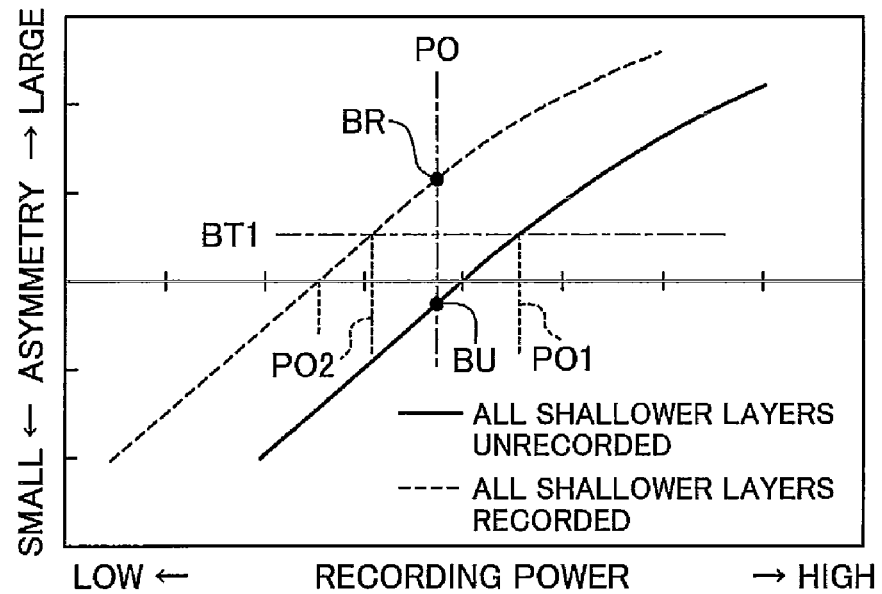
FIG. 10 is a graph showing exemplary relations between recording power and asymmetry in a multilayer recordable optical disc.

FIG. 10 shows an example of the relation between recording power and asymmetry. The vertical axis in FIG. 10 represents the asymmetry value instead of the recording performance shown in FIG. 9. As shown in FIG. 10, the asymmetry values (dashed curve) when the shallower recording layers are in the unrecorded state are offset from the asymmetry values (solid curve) when the shallower recording layers are in the recorded state.

FIG. 11 shows an example of the relation between asymmetry value and recording performance. The horizontal axis in FIG. 11 represents the asymmetry value instead of the recording power shown in FIG. 9. As shown in FIG. 11, there is little difference in recording performance relative to asymmetry values between the recorded and unrecorded states of the shallower recording layers, and the optimal (best overall) asymmetry value is the value indicated by BT1. If the recording power is adjusted using the best overall asymmetry value BT1 as the OPC target value, then when all the recording layers shallower than the area in which OPC is performed are in the unrecorded state, the recording power will be adjusted to PO1 in FIG. 9, and when all the recording layers shallower than the area in which OPC is performed are in the recorded state, the recording power will be adjusted to PO2 in FIG. 9.

Next, the OPC parameter correction carried out in the present embodiment will be described for several cases.

When all layers shallower than the recording layer including the area in which OPC will be performed are in the unrecorded state, to maintain an asymmetry value at BT1, as shown in FIG. 10, it is necessary to increase the recording power to PO1; if the recording power is PO (which is less than PO1), then as shown in FIG. 10 the OPC target value (target asymmetry value) must be BU, which is less than BT1. Conversely, when all layers shallower than the recording layer including the area in which OPC will be performed are recorded, to maintain an asymmetry value at BT1, as shown in FIG. 10, it is necessary to reduce the recording power to PO2; if the recording power is PO (which is greater than PO2), then as shown in FIG. 10 the OPC target value (target asymmetry value) must be BR, which is greater than BT1.

Since BT1 is located at the midpoint between BU and BR, BU and BR can be obtained from BT1 by adding or subtracting an offset of (BR−BU)/2.

It is assumed that the optical disc has four recording layers, for example, and recording is performed in the first recording layer (the deepest layer). If the recording layers shallower than the area in which OPC will be performed are all in the unrecorded state, the values of Nr, R, and U set in step S21 are NR=3, R=0, and U=3, so from equation (3), $$BT2=BT1+BO\times(0-3)/3=BT1-BO \quad (3A)$$

Since BR>BU in FIG. 10, the value of BO given by equation (4) is positive. It is therefore understood that the result of the calculation corresponds to BU.

Conversely, if all layers shallower than the area in which OPC is performed are already recorded, then Nr=3, R=3, and U=0, so from equation (3), $$BT2=BT1+BO\times(3-0)/3=BT1+BO \quad (3B)$$

Since BO has a positive value, it is understood that the result of the calculation corresponds to BR.

The description above applies to cases in which all of the recording layers shallower than the OPC area are unrecorded, and in which all of these layers have already been recorded. Next, a case in which only some of the recording layers shallower than the area for OPC have been recorded will be described.

If only some of the recording layers shallower than the recording layer in which recording will be carried out are already recorded, then the relation between recording power and asymmetry shown in FIG. 10 shifts to a curve (not shown) located between the solid curve for the case in which all shallower layers are unrecorded and the dashed curve for the case in which all shallower layers are already recorded. For example, if the numbers of recorded and unrecorded shallower layers are equal, an asymmetry value approximately halfway between the asymmetry value for the all-unrecorded case and the asymmetry value for the all-recorded case will be obtained. That is, the asymmetry value shifts according to the numbers of recorded and unrecorded layers among the shallower layers.

It is therefore so arranged that an offset which depends on the number R of the recorded layers, and the number U of the unrecorded layers, among the recording layers shallower than the area in which OPC is performed, and is added as shown by formula (3).

In view of the curves shown in FIG. 9, shifting the recording power from the optimal recording power obtained as result of OPC might be considered, instead of shifting the OPC target value. But shifting the OPC target value has the following advantage.

As shown in FIG. 9, the amount of variation in the recording performance occurring above the optimal recording power may differ from the amount of variation in the recording performance occurring below the optimal recording power. This is because in the curves shown in FIG. 10, the relation between the recording power and the asymmetry value is not linear; the gradient on the low power side is steeper than the gradient on the high power side. In contrast, the change in recording performance relative to the asymmetry value is substantially the same on both the high power and low power sides as shown in FIG. 11.

Another advantage of shifting the OPC target value is that the recording power curves tend to shift in response to factors such as temperature. Since the temperature conditions during actual recording may differ from the temperature conditions under which the power offsets are calculated, it is difficult to decide what the power offsets should be. If excessive power offsets are applied, recording performance becomes erratic.

The relation between the asymmetry value and recording performance, however, is not greatly affected by temperature, so that a proper correction can be applied by correcting the OPC target value.

According to the present Embodiment 1, the target asymmetry value used in performing OPC is corrected according to the number of unrecorded layers (U) and the number of recorded layers (R) among the recording layers shallower than the area in which OPC is performed, and the predefined amount of shift (BR−BU) of the asymmetry value in the way described above, so that even if the number of unrecorded layers (U) and the number of recorded layers (R) among the recording layers change in the recording area in which information is recorded, variations in recording performance are suppressed and stable recording can be carried out.

Furthermore, no additional OPC areas are needed, and the amount of processing time needed for OPC does not increase.

Although the optical disc 500 inserted in the optical recording and reproducing device 100 is a Blu-ray disc in the embodiment above, the invention can also be applied to any other kind of multilayer optical discs, or any other kind of optical recording medium having a plurality of recording layers.

Furthermore, in the present embodiment described above, the offset (standard offset) of the asymmetry value is determined from the asymmetry value obtained for the case in which recording has been performed when all the shallower recording layers are unrecorded and the asymmetry value obtained for the case in which recording has been performed when all the shallower recording layers, with the recording power used in both cases being identical, and the OPC target value is corrected based on the standard offset and on the numbers of recorded and unrecorded layers in the shallower recording layers in the optical disc used for the intended information recording.

However, the standard offset may be calculated by other procedures. For example, the offset of the asymmetry value between the case in which all the shallower recording layers are unrecorded and a case in which just one of the shallower recording layers is recorded may be used as the standard offset, and the OPC target value may be corrected on the basis of the standard offset thus determined, and the number of recorded and unrecorded layers in the shallower recording layers.

To generalize, if the standard target offset BO is determined on the basis of
an asymmetry value (the first reproduced signal parameter) Ba obtained when one of the recording layers (the test data recording layer) has been recorded in a first recorded state (first combination of recorded and unrecorded states) in which the number of the recording layers shallower than the test data recording layer is a and
an asymmetry value (the second reproduced signal parameter) Bb obtained when the test data recording layer has been recorded in a second recorded state (second combination of recorded and unrecorded states) in which the number of the recording layers shallower than the test data recording layer is b, and using the same recording power as in the first recorded state, then the following equation (5) is used instead of the above equation (4)

$$BO=\{(Ba-Bb)/2\}\times\{Nt/(a-b)\} \quad (5)$$

In equation (5), Nt is the number of shallower recording layers in the optical disc used for the determination of standard target offset, in the first and second recorded states, and (Nt/(a−b)) is the ratio of the number Nt of the shallower recording layers to the difference between the number a of the shallower recorded layers in the first recorded state and the number b of the recorded layers in the second recorded state.

The standard target offset BO is determined in advance for each optical disc, for example, for each class of optical disc, i.e., for each unique information value, and stored in the ROM 220 or elsewhere.

When the corrected target value BT2 is calculated for an optical disc inserted into the optical recording and reproducing device for the purpose of recording, the calculation in equation (3) is carried out using the stored standard target offset BO (determined using equation (5)). For example, the number of unrecorded recording layers (U) is subtracted from the number of recorded recording layers (R) to obtain a value, which is then is divided by the total number of recording layers (Nr) to obtain an offset correction coefficient ((R−U)/Nr), and the product of the standard target offset (BO) multiplied by the offset correction coefficient (R−U)/Nr is added to the standard target value (BT1) to obtain the corrected target value (BT2).

The value of a may be either Nt or zero. When a=Nt (and therefore Ba=BR), equation (5) changes as below.

$$BO=\{(BR-Bb)/2\}\times\{Nt/(Nt-b)\} \quad (6)$$

When a=0 (and therefore Ba=BU), equation (5) changes as below.

$$BO = \{(BU - Bb)/2\} \times \{Nt/(0 - b)\} \quad (7A)$$
$$= \{(Bb - BU)/2\} \times \{Nt/b\} \quad (7B)$$

In the embodiment described above, an asymmetry value offset (standard offset) between a case in which all the shallower recording layers in the optical disc used for the determination of standard target offset were unrecorded, and a case in which all the shallower recording layers in the optical disc used for the determination of standard target offset were recorded, with the recording power used for the recording in both cases being identical is determined, and a correction coefficient for the asymmetry value offset is determined from the numbers of recorded and unrecorded layers among the shallower recording layers of the optical disc used for the intended information recording, and is used for the correction of the OPC target value. However, in some cases, such as when the standard offset is small, the correction coefficient need not be calculated precisely from these numbers of layers. For example, approximate correction coefficients may be set for a case in which there are more recorded layers than unrecorded layers among the shallower recording layers, a case in which the numbers are about equal, and a case in which there are fewer recorded layers.

In the embodiment described above, the amounts of correction to the OPC target value under the condition of identical recording power are identical between the case where the shallower layers of the optical disc used for intended information recording are all unrecorded, and the case where the shallower layers of the optical disc used for intended information recording are all recorded are identical. But it is generally common to start recording from the deeper recording layers, and particularly when the number of recording layers is large, the shallower layers will rarely be all recorded. Accordingly, the OPC correction may be further offset, or multiplied by a coefficient, or modified in some other way, thereby bringing the corrected OPC target value closer to BU in FIG. 10, in order to improve the recording performance when the shallower layers are unrecorded.

In the embodiment described above, the same-power asymmetry value offset obtained from the asymmetry value for the case in which the shallower layers are all recorded and the asymmetry value for the case in which the shallower layers are all unrecorded is determined in advance for each value of the information unique to the optical disc, but for a some class of optical discs for which the offset is not determined in advance, an average value of the offsets of the asymmetry values of a plurality of classes of optical discs for which offsets have been determined in advance may be used.

Alternatively, one or more areas with different states may be prepared in the shallower layers by use of test write areas such as OPC areas in the optical disc having been inserted in the optical recording and reproducing device for the purpose of information recording, the difference in the asymmetry value may be determined for the cases where recording is performed in the respective areas of the recording layer with the same recording power, and the results thus obtained may be used.

In the embodiment described above, an OPC method that uses an asymmetry value as a target value has been described. Similar methods can be used for OPC methods that use modulation depth as a target value. In this case, the modulation depth characteristic relative to recording power saturates in the area with high recording power. It is necessary to calculate the modulation depth offset at a low power free from saturation in modulation depth.

In the embodiment described above, the OPC target value is corrected on the basis of equations (3), (4), (5), (6), and (7B), but the OPC target value may be corrected on the basis of other equations provided they yield similar results.

In the embodiment described above, the difference in asymmetry value between the case in which all the shallower recording layers are unrecorded and the case in which all the shallower recording layers are recorded is found in advance for optical discs having each unique information value. It is also contemplated that the difference in asymmetry value may be set for each type of optical disc (write-once optical disc, rewritable optical disc), or each number of recording layers in the optical disc (a three-layer optical disc, a four-layer optical disc), but the difference is preferably found for each possible value of the unique information pertaining to the optical disc.

The asymmetry value difference is preferably found in advance for each layer on which recording may be performed. But if all the differences are alike, the same asymmetry value difference may be used for all layers in the same optical disc.

It suffices to calculate the asymmetry value difference once for each model of optical recording and reproducing device. The same value can be used for the many optical recording and reproducing devices of the same model. In other words, once an asymmetry value difference is found for a certain model of optical recording and reproducing device, that difference can be set in other optical recording reproducing devices of the same model before they are shipped.

Those skilled in the art will recognize that further variations are possible within the scope of the invention, which is defined in the appended claims.

What is claimed is:

1. An optical recording device for recording information on an optical recording medium having a plurality of recording layers by irradiation with laser light, comprising:
   a target value reading unit that reads a standard target value for calibrating recording power from the optical recording medium or from within the optical recording device, the standard target value being determined in advance for each class of optical recording medium;
   a recording power calibration unit that calibrates the recording power by performing a test write in a recording power calibration area provided in a recording layer having an information recording area;
   an information recording unit that records information on the recording layer having the information recording area, by use of the recorded power calibrated by the recording power calibration unit;
   a recorded state discrimination unit that determines a recorded state of one or more shallower recording layers in front of the recording layer to be recorded by the information recording unit, as seen from a laser light incidence side in a position corresponding to the recording power calibration area; and
   a target value correction unit that corrects the standard target value to generate a corrected target value, based on a difference in a reproduced signal parameter between a first recorded state of one or more shallower recording layers in front of a recording layer in which test data is to be recorded, as seen from a laser light incidence side, and a second recorded state of the shallower recording layers, and on the recorded state as determined by the recorded state discrimination unit;
   wherein the recording power calibration unit calibrates the recording power by use of the corrected target value.

2. The optical recording device of claim 1, wherein the difference in the reproduced signal parameter is obtained in advance using one or more optical recording media which are of the same class as the optical recording medium which is recorded by the information recording unit.

3. The optical recording device of claim 1, wherein
   a standard target offset is determined in advance on a basis of the difference in the reproduced signal parameter between a first case in which the test data is recorded when the one or more shallower recording layers are in the first recorded state and a second case in which the test data is recorded when the shallower recording layers are in the second recorded state, the recording power used for the recording being identical between the first and second cases,
   the recorded state discrimination unit determines whether each of the shallower recording layers in front of the recording layer which is to be recorded by the information recording unit is recorded or unrecorded in the position corresponding to the recording power calibration area, and finds the number of recorded layers and the number of unrecorded layers, and
   the target value correction unit determines the corrected target value from the standard target offset and the proportion of the number of recorded layers and the number of unrecorded layers.

4. The optical recording device of claim 3, wherein the first recorded state is a state in which all of the shallower recording layers are recorded or unrecorded,
   a first reproduced signal parameter is obtained for the first case,
   a second reproduced signal parameter is obtained for the second case,
   the standard target offset is calculated as a product of one-half of a difference obtained by subtracting the second reproduced signal parameter from the first reproduced signal parameter and a ratio of the number of shallower recording layers to a value obtained by subtracting the number of recorded layers in the second recorded state from the number of recorded layers in the first recorded state, and
   the target value correction unit
   calculates, as an offset correction coefficient, a value obtained by subtracting the number of unrecorded layers from the number of recorded layers as determined by the recorded state discrimination unit and dividing the result of the subtraction by the number of shallower recording layers,
   multiplies the standard target offset by the offset correction coefficient, and
   adds the resulting value to the standard target value to obtain the corrected target value.

5. The optical recording device of claim 3, wherein:
   the first recorded state is a state in which all of the shallower recording layers are recorded;
   the second recorded state is a state in which all of the shallower recording layers are unrecorded;
   if a first reproduced signal parameter obtained for the first case is denoted BR, and
   a second reproduced signal parameter obtained for the second case is denoted BU, then the standard target offset BO is obtained as $$BO=(BR-BU)/2,$$

and if the number of recorded layers obtained by the recorded state discrimination unit is denoted R, the number of unrecorded layers is denoted U, and the total number of shallower recording layers in front of the recording layer which is to be recorded by the information recording unit is denoted Nr, then the target value correction unit calculates the corrected target value BT2 from the standard target value BT1 as $$BT2=BT1+BO\times(R-U)/Nr.$$

6. The optical recording device of claim 1, wherein the reproduced signal parameter is an asymmetry value of the reproduced signal.

7. The optical recording device of claim 1, wherein the reproduced signal parameter is a modulation depth of the reproduced signal.

8. The optical recording device of claim 4, further comprising a standard target offset storage unit that stores the standard target offset together with the information indicating the class of the optical recording medium, wherein the standard target offset is found in advance by experiment for each class of optical recording medium and stored, together with the information indicating the class of the optical recording medium, in the standard target offset storage unit, and the standard target offset stored in the standard target offset storage unit is read, and the standard target value is corrected by the target value correction unit to generate the corrected target value, according to the class of the optical recording medium.

9. The optical recording device of claim 4, further comprising a standard target offset storage unit that stores the standard target offset together with the information unique to the optical recording medium, wherein the standard target offset is found in advance by experiment for each information unique to optical recording medium and stored, together with the information unique to the optical recording medium, in the standard target offset storage unit, and the standard target offset stored in the standard target offset storage unit is read, and the standard target value is corrected by the target value correction unit to generate the corrected target value, according to the information unique to the optical recording medium.

10. An optical recording method for recording information on an optical recording medium having a plurality of recording layers by irradiation with laser light, comprising:

a target value reading step that reads a standard target value for calibrating recording power from the optical recording medium or from within an optical recording device used for implementing the optical recording method, the standard target value being determined in advance for each class of optical recording medium;

a recording power calibration step that calibrates the recording power by performing a test write in a recording power calibration area provided in a recording layer having an information recording area;

an information recording step that records information on the recording layer having the information recording area, by use of the recorded power calibrated by the recording power calibration step;

a recorded state discrimination step that determines a recorded state of one or more shallower recording layers in front of the recording layer to be recorded by the information recording step, as seen from a laser light incidence side in a position corresponding to the recording power calibration area; and a target value correction step that corrects the standard target value to generate a corrected target value, based on a difference in a reproduced signal parameter between a first recorded state of one or more shallower recording layers in front of a recording layer in which test data is to be recorded, as seen from a laser light incidence side in a position corresponding to the recording power calibration area, and a second recorded state of the shallower recording layers, and on the recorded state as determined by the recorded state discrimination step;

wherein the recording power calibration step calibrates the recording power by use of the corrected target value.

11. The optical recording method of claim 10, wherein the difference in the reproduced signal parameter is obtained in advance using one or more optical recording media which are of the same class as the optical recording medium which is recorded by the information recording step.

12. The optical recording method of claim 10, wherein a standard target offset is determined in advance on a basis of the difference in the reproduced signal parameter between a first case in which the test data is recorded when the one or more shallower recording layers are in the first recorded state and a second case in which the test data is recorded when the shallower recording layers are in the second recorded state, the recording power used for the recording being identical between the first and second cases, the recorded state discrimination step determines whether each of the shallower recording layers in front of the recording layer which is to be recorded by the information recording step is recorded or unrecorded in the position corresponding to the recording power calibration area, and finds the number of recorded layers and the number of unrecorded layers, and the target value correction step determines the corrected target value from the standard target offset and the proportion of the number of recorded layers and the number of unrecorded layers.

13. The optical recording method of claim 12, wherein the first recorded state is a state in which all of the shallower recording layers are recorded or unrecorded, a first reproduced signal parameter is obtained for the first case, a second reproduced signal parameter is obtained for the second case, the standard target offset is calculated as a product of one-half of a difference obtained by subtracting the second reproduced signal parameter from the first reproduced signal parameter and a ratio of the number of shallower recording layers to a value obtained by subtracting the number of recorded layers in the second recorded state from the number of recorded layers in the first recorded state, and the target value correction step calculates, as an offset correction coefficient, a value obtained by subtracting the number of unrecorded layers from the number of recorded layers as determined by the recorded state discrimination step and dividing the result of the subtraction by the number of shallower recording layers, multiplies the standard target offset by the offset correction coefficient, and adds the resulting value to the standard target value to obtain the corrected target value.

14. The optical recording method of claim 12, wherein:

the first recorded state is a state in which all of the shallower recording layers are recorded;

the second recorded state is a state in which all of the shallower recording layers are unrecorded;

if a first reproduced signal parameter obtained for the first case is denoted BR, and a second reproduced signal parameter obtained for the second case is denoted BU, then the standard target offset BO is obtained as $$BO=(BR-BU)/2,$$

and if the number of recorded layers obtained by the recorded state discrimination step is denoted R, the number of unrecorded layers is denoted U, and the total number of shallower recording layers in front of the recording layer which is to be recorded by the information recording step is denoted Nr, then the target value correction step calculates the corrected target value BT2 from the standard target value BT1 as $$BT2=BT1+BO\times(R-U)/Nr.$$

15. The optical recording method of claim 10, wherein the reproduced signal parameter is an asymmetry value of the reproduced signal.

16. The optical recording method of claim 10, wherein the reproduced signal parameter is a modulation depth of the reproduced signal.

17. The optical recording method of claim 13, wherein the standard target offset is found in advance by experiment for each class of optical recording medium and stored, together with the information indicating the class of the optical recording medium, in a standard target offset storage unit, and the standard target offset stored in the standard target offset storage unit is read, and the standard target value is corrected by the target value correction step to generate the corrected target value, according to the class of the optical recording medium.

18. The optical recording method of claim 13, wherein the standard target offset is found in advance by experiment for each information unique to optical recording medium and stored, together with the information unique to the optical recording medium, in a standard target offset storage unit, and the standard target offset stored in the standard target offset storage unit is read, and the standard target value is corrected by the target value correction unit to generate the corrected target value, according to the information unique to the optical recording medium.

* * * * *